United States Patent
McColloch

(10) Patent No.: US 7,553,091 B2
(45) Date of Patent: Jun. 30, 2009

(54) STACKABLE MULTI-OPTICAL FIBER CONNECTOR MODULES AND DEVICES FOR ALIGNING SETS OF THE STACKABLE MULTI-OPTICAL FIBER CONNECTOR MODULES AND COUPLING OPTICAL SIGNALS BETWEEN THEM

(75) Inventor: Laurence Ray McColloch, Santa Clara, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 62 days.

(21) Appl. No.: 11/751,101

(22) Filed: May 21, 2007

(65) Prior Publication Data

US 2008/0095501 A1    Apr. 24, 2008

Related U.S. Application Data

(60) Provisional application No. 60/862,200, filed on Oct. 19, 2006.

(51) Int. Cl.
*G02B 6/36* (2006.01)
(52) U.S. Cl. .............................. 385/90; 385/53; 385/58; 385/65; 385/71; 385/59
(58) Field of Classification Search .............. 385/53–59
See application file for complete search history.

(56) References Cited

U.S. PATENT DOCUMENTS

| | | | |
|---|---|---|---|
| 5,325,455 A * | 6/1994 | Henson et al. ................. | 385/89 |
| 6,259,856 B1 * | 7/2001 | Shahid ......................... | 385/147 |
| 6,272,272 B1 * | 8/2001 | Ford ............................. | 385/52 |
| 6,434,315 B1 * | 8/2002 | Grois et al. .................. | 385/139 |
| 6,491,447 B2 | 12/2002 | Aihara | |
| 6,574,107 B2 | 6/2003 | Jeon et al. | |
| 6,782,181 B2 | 8/2004 | Tourne | |
| 7,109,524 B2 | 9/2006 | Killer | |
| 7,228,020 B2 | 6/2007 | Weigert | |
| 2003/0072538 A1 * | 4/2003 | Jin et al. ........................ | 385/89 |
| 2003/0091301 A1 * | 5/2003 | Lee et al. ....................... | 385/89 |
| 2004/0028315 A1 | 2/2004 | Weigel | |
| 2004/0061956 A1 | 4/2004 | Schunk et al. | |
| 2005/0018993 A1 * | 1/2005 | Rolston et al. ............... | 385/137 |
| 2005/0141823 A1 | 6/2005 | Han et al. | |
| 2005/0259927 A1 | 11/2005 | Kato | |
| 2007/0077008 A1 | 4/2007 | Jeon | |
| 2008/0282742 A1 | 11/2008 | Colgan et al. | |

* cited by examiner

*Primary Examiner*—Frank G Font
*Assistant Examiner*—Eric Wong

(57) ABSTRACT

The connector modules that are designed and shaped to mate with one side of the receptacle of the panel have mating devices that enable them to be stacked one atop the other inside of the receptacle in a relatively rigid stack. The connector modules that are designed and shaped to mate with the other side of the receptacle of the panel have mating devices that enable them to be held in slots that are slightly separated from one another by air gaps to allow them to "float" in the receptacle. By floating the connector modules in one side of the receptacle while having a relative rigid stack of connector modules in the other side of the receptacle, it is ensured that very precise optical alignment will be maintained between the respective lenses in the connector modules that face each other in the receptacle.

12 Claims, 13 Drawing Sheets

STACKABLE MULTI-OPTICAL FIBER CONNECTOR MODULES AND DEVICES FOR ALIGNING SETS OF THE STACKABLE MULTI-OPTICAL FIBER CONNECTOR MODULES AND COUPLING OPTICAL SIGNALS BETWEEN THEM

CROSS-REFERENCE TO RELATED APPLICATIONS

This application claims priority to U.S. Provisional Application Ser. No. 60/862,200, entitled "TRANSCEIVER AND CONNECTOR", filed on Oct. 19, 2006, to U.S. Nonprovisional application Ser. No. 11/669,247, entitled "A TRANSCEIVER MODULE FOR OPTICAL COMMUNICATIONS AND METHOD FOR TRANSMITTING AND RECEIVING DATA", filed on Jan. 31, 2007, and to U.S. Nonprovisional application Ser. No. 11/683,118, entitled "A MULTI-OPTICAL FIBER CONNECTOR MODULE FOR USE WITH A TRANSCEIVER MODULE AND METHOD FOR COUPLING OPTICAL SIGNALS BETWEEN THE TRANSCEIVER MODULE AND MULTIPLE OPTICAL FIBERS", filed on Mar. 7, 2007, all of which are incorporated herein by reference in their entireties.

TECHNICAL FIELD OF THE INVENTION

The invention relates to optical communications. More particularly, the invention relates to a stackable multi-fiber connector module and receptacles and plugs that are configured to receive and align stacks of the stackable multi-fiber connector modules.

BACKGROUND OF THE INVENTION

In optical communications networks, a variety of different types of devices are used to couple light from the end of a fiber into the end of another fiber, to couple light from the end of a fiber onto an optical sensor (e.g., a photodiode) of a transceiver module, and to couple light from a light emitting device (e.g., a laser diode) of a transceiver module into an end of an optical fiber.

FIG. 1A illustrates a perspective view of a known multi-fiber connector module 31 manufacture by U.S. Conec Ltd. of Hickory, N.C. The connector module 31 has become known in the optical connector industry as the MTP® connector. The connector module 31 holds ends of receive fibers and has an optics system that couples light from a plurality of laser diodes of a transceiver module (not shown), or light from the ends of fibers held in an identical mated MTP connector module (not shown), into the ends of the receive fibers held in the connector module 31. Likewise, the connector module 31 holds the ends of transmit fibers and the optics system of the module 31 focuses light output from the ends of the transmit fibers onto a plurality of photodiodes of a transceiver module, or onto the ends of a plurality of fibers held in an identical mated MTP connector module.

The transmit and receive fibers held in the connector module 31 are part of a fiber ribbon 32 having a total of 4, 8, 12 or 24 optical fibers. A strain relief device 33 holds the fibers below the ends to prevent the fiber ends from moving in the event that mechanical loading on the cable occurs due to tugging or pulling on the cable. This prevents the integrity of the optical signals from being degraded due to a problem referred to in the optical communications industry as "wiggle" or "wiggle losses".

The connector module 31 has an outer housing 34 and an inner housing 35. The inner housing has latching elements 36 thereon for securing the module 31 to a receptacle 61 of a transceiver module. A collar 32 surrounds the outer housing 34 of the connector module 31 and prevents the latching elements 36A and 36B from unlatching when the connector module 31 is connected to the transceiver module receptacle or to a receptacle that interconnects two MTP connector modules 31. The ends of the transmit and receive fibers are held within a multi-fiber ferrule 37 that extends slightly beyond the end 38 of the inner housing 35. The ends (not shown) of the fibers are polished and extend a very small distance beyond the end of the ferrule 37 such that the polished end of each fiber provides a flat optical element for coupling light between the polished end and an optical element (not shown) of the receptacle 61.

FIG. 1B illustrates a cutaway view of the MTP connector module 31 shown in FIG. 1A that reveals features inside of the connector module 31 and receptacle 61. Inside of the inner housing 35, the ferrule 37 is moveably secured and spring-loaded to allow it to move in the axial direction of the fibers. A spring (not shown) is located in the cylindrical groove 42 formed in the inner housing 35 of the connector module 31. When the connector module 31 is latched to the receptacle 61, the outer end 37A of the ferrule 37 is in abutment with the contact surface (not shown) of the receptacle 61. This contact surface of the receptacle 61 contains optical elements (not shown), which will be described below in more detail with reference to FIG. 1C. The abutment of the ferrule end 37A with this contact surface of the receptacle 61 exerts a force on the end 37A of the ferrule 37 in the axial direction of the fibers that causes the end 37B of the ferrule to press against and thereby compress the spring to allow the ferrule 37 to retract into the inner housing 35 of the connector module 31. The ferrule 37 retracts, floating against the surface of the receptacle 61 with zero clearance between them. This zero clearance between the ferrule end 37A and the surface of the receptacle 61 ensures that the flat optical elements comprising the polished ends of the fibers are in contact with the optics elements contained in the contact surface, which ensures efficient optical coupling.

FIG. 1C illustrates a cutaway view of the MTP connector module 31 shown in FIG. 1B with the connector module 31 connected to the receptacle 61. Only one side of the ferrule 37 is shown in FIG. 1C. The ferrule 37 has a cylindrical opening 37C formed in the left side thereof and a cylindrical opening (not shown) formed in the right side thereof for receiving cylindrical pins 62A and 62B that extend from the contact surface 63 of the receptacle 61 for guiding and alignment. The fibers (not shown) are positioned in respective grooves 41 formed in the ferrule 37 and secured thereto by an adhesive material. Latching elements 64A and 64B of the receptacle 61 engage latching elements 36A and 36B to lock the connector module 31 to the receptacle 61. The collar 32 is in sliding engagement with the outer housing of the connector module 31 and has an inner surface 39 that presses against the latching elements 64A and 64B to prevent them from disengaging from the latching elements 36A and 36B. This tight physical coupling and precision alignment of the connector module 31 and the receptacle 61 results in tight optical alignment, which, in turn, results in low optical losses and good signal integrity.

The MTP connector module 31 has been widely adopted due to its low wiggle loss, high optical coupling efficiency and high manufacturing yield. One of the disadvantages of the MTP connector module 31 is that it is relatively expensive due to the fact that the ends of the fibers must be polished and due to the fact that the parts must be manufactured with extremely high precision in order to achieve precise physical and optical alignment. Because of the precision with which physical alignment must be maintained in order to achieve the necessary optical coupling efficiency, any reduction in part precision will result in unacceptable optical losses. Attempts have been made to use cleaved fiber ends in the MTP connector module 31, but such attempts generally have been unsuccessful because they resulted in the connector modules having inconsistent optical coupling losses.

Another disadvantage of the MTP connector module 31 is that it is relatively inflexible with respect to accommodating changes in fiber density. In certain situations, there is a need to couple dense arrays of optical fibers to a large number of transceiver modules, such as in central offices where banks of transceiver modules used. In these types of environments, racks of transceiver modules are typically provided, with each rack having a front panel with receptacles configured to receive respective connector modules on the front and back sides of the panels. The receptacles align the respective connector modules on the front and back sides to enable light to be coupled between the ends of the fibers contained in the connector modules on the front side and the ends of the fibers contained in the connector modules on the back side. The fibers connected to the connector modules on the back side of the panel are then connected on opposite ends of the fibers to other respective connector modules, which are then connected to respective transceiver modules held in the racks.

If a need arises to increase the fiber density, this is typically accomplished by replacing the connector modules with connector modules that are designed to hold a larger number of fibers. For example, assuming the multi-fiber ferrule 37 of the MTP connector module 31 is a 2-by-12 configuration designed to hold a total of twenty-four fibers, if a need arises to increase the fiber density by, for example, 50%, the 2-by-12 MTP connector modules will typically be replaced with MTP connector modules having 4-by-12 configurations. This corresponds to a 100% increase in fiber density capability when only a 50% increase is needed. Thus, this solution is relatively inflexible with respect to accommodating changes in fiber density. Furthermore, MTP connector modules of this type are expensive, and therefore replacing them is costly. Also, having to replace connector modules increases yield losses.

In addition, this type of MTP connector module is also relatively inflexible with respect to its ability to accommodate different routing needs of different customers and with respect to its ability to accommodate re-routing needs. Because the ends of the fibers are permanently connected inside of the connector module, the fibers cannot be separated out based on routing or re-routing needs. Therefore, an entire 2-by-12 or an entire 4-by-12 connector module may need to be disconnected, removed and reconnected at another location. Consequently, routing and re-routing needs may not be able to be met, or may be able to be met only with considerable difficulty and cost.

Accordingly, a need exists for a multi-fiber connector module that enables changes in fiber density needs, routing needs and re-routing needs to be accommodated in a way that is relatively simple and inexpensive without having to replace connector modules. It would also be desirable to provide a multi-fiber connector module that can be made at relatively low cost by using cleaved fibers instead of polished fibers and that can be made with relatively inexpensive parts without sacrificing performance or manufacturing yield.

SUMMARY

The invention provides a receptacle, a multi-fiber connector module for connecting to one side of the receptacle, a plug for connecting to the other side of the receptacle, a multi-fiber connector module for insertion into the plug, and a method for coupling light between at least one multi-fiber connector module connected to one side of the receptacle and at least one multi-fiber connector module connected to the plug. One side of the receptacle is configured to receive multiple multi-fiber connector modules in a floating configuration to allow some movement of the connector modules within the receptacle. The other side of the receptacle is configured to receive the plug in which multiple multi-fiber connector modules have been inserted in a stacked configuration in which movement of the connector modules within the plug is substantially prevented.

The floating configuration on one side of the receptacle and the stacked configuration in the plug on the other side of the receptacle allows the modules of the floating configuration to be interconnected to respective modules of the stacked configuration in a way that prevents undesired mechanical loading on the interconnected modules while also ensuring that the modules in the floating configuration remain in optical alignment with the respective modules in the stacked configuration.

These and other features and advantages of the invention will become apparent from the following description, drawings and claims.

DETAILED DESCRIPTION OF ILLUSTRATIVE EMBODIMENTS

One of the connector modules described herein is designed and shaped to mate with one side (e.g., a back side) of a receptacle of a panel and one of the connector modules described herein is designed and shaped to mate with the other side (e.g., the front side) of the receptacle of the panel. Both connector modules have features that make them extremely precise with respect to physical and optical alignment, and, at the same time, are capable of being made at relatively low costs. The connector modules that are designed and shaped to mate with the one side of the receptacle of the panel have mating devices that enable them to be stacked one atop the other inside of the receptacle in a relatively rigid stack. The connector modules that are designed and shaped to mate with the other side of the receptacle of the panel have mating devices that enable them to be held in slots that are slightly separated from one another by air gaps to allow the connector modules to "float" in the receptacle. By floating the connector modules in the one side of the receptacle while having a relative rigid stack of connector modules in the other side of the receptacle, it is ensured that very precise optical alignment will be maintained between the respective lenses in the connector modules that face each other in the front and back side of the receptacles.

While the embodiments described herein show the floating arrangement of connector modules in the back side of the receptacle and the relatively rigid stack of receptacles in the front side of the receptacle, this arrangement could be reversed with the same effect. In other words, the relatively rigid stack of connector modules may be held in the back side of the receptacle while the floating connector modules are held in the front side of the receptacle module. Floating one stack of connector modules while holding the other stack in a relatively rigid mounting configuration allows precision optical alignment to be achieved. It does not matter whether one side of the receptacle or the other holds a particular type of stack.

Figure 1A:
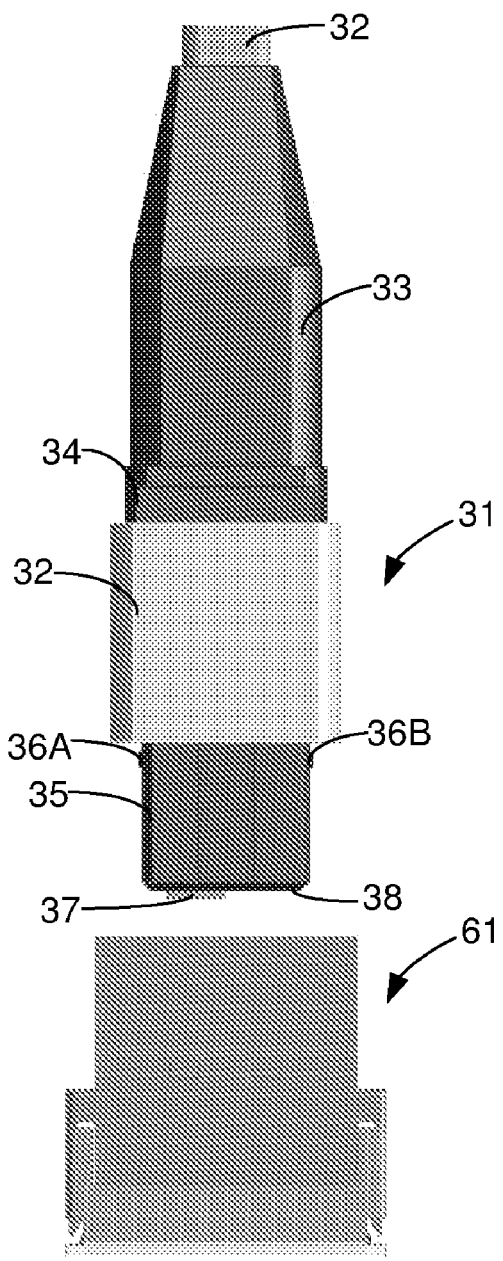
FIG. 1A illustrates a three dimensional (3-D) top view of a known multi-fiber connector module.
Figure 1B:
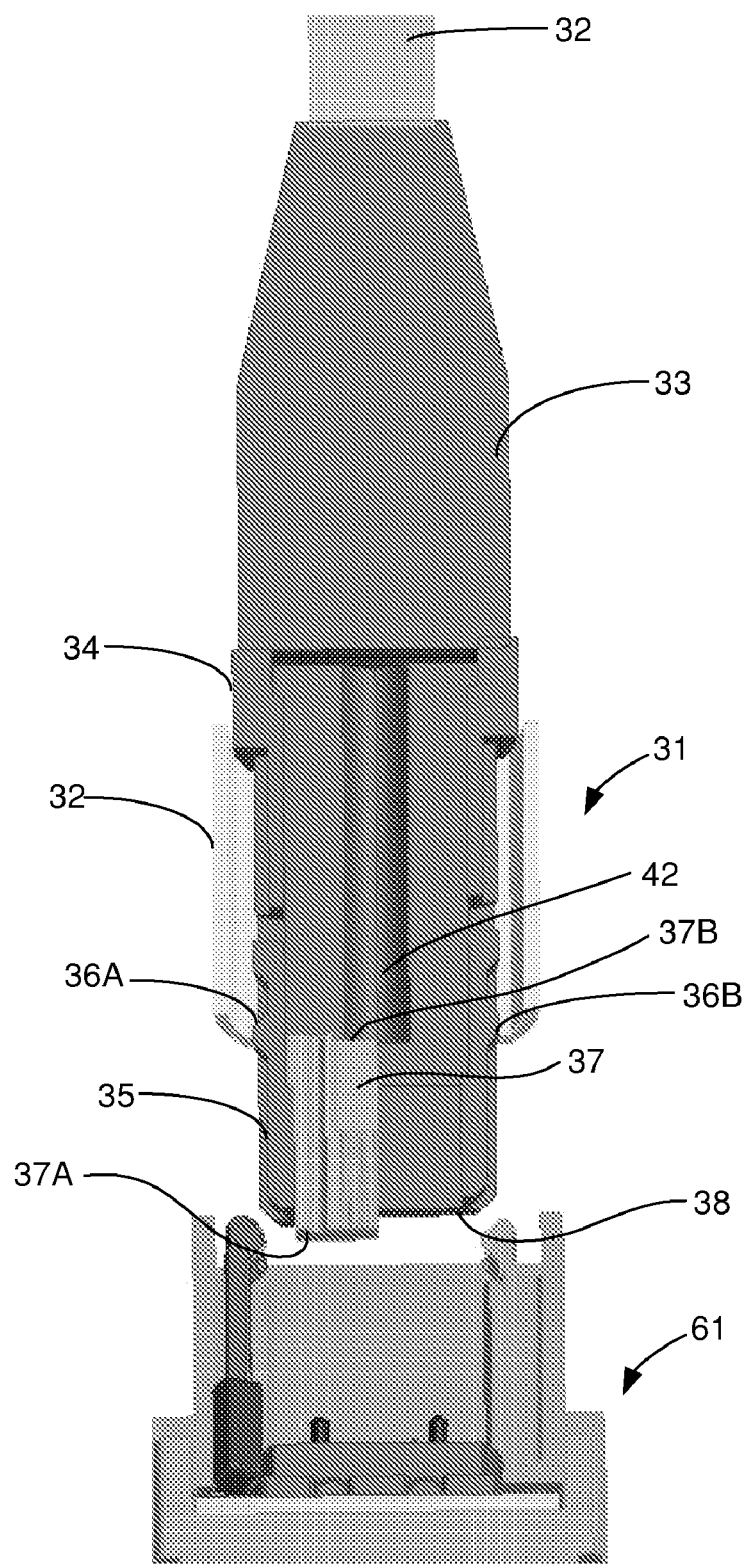
FIG. 1B illustrates a 3-D cutaway view of the MTP connector module shown in FIG. 1A that reveals features inside of the connector module and transceiver receptacle.
Figure 1C:
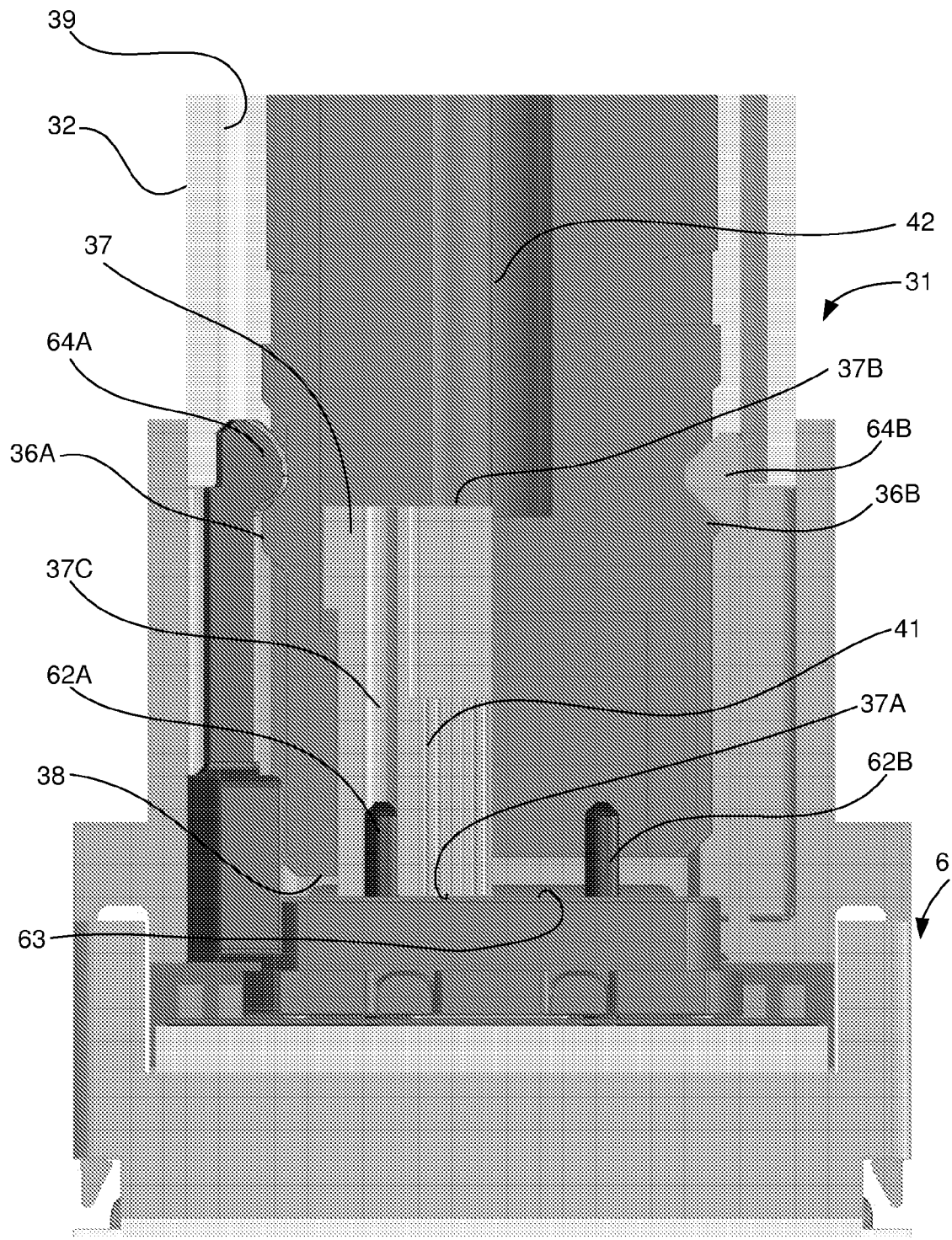
FIG. 1C illustrates a 3-D close-up cutaway view of the MTP connector module shown in FIG. 1B with the connector module connected to the transceiver receptacle.

The fiber ends held in the connector module are cleaved and are covered in a refractive index matching epoxy. A short distance away from the fiber ends, the fibers are held by a strain relief mechanism to prevent external forces exerted on the fibers from being translated to the fiber ends. By using cleaved fiber ends as opposed to polished fiber ends, the costs associated with making and assembling the connector modules are reduced in comparison to the costs associated with making and assembling the MTP connector module described above with reference to FIGS. 1A-1C. In addition, the optics systems of the connector modules are configured in such a way that some movement of the parts of the connector module can occur without resulting in optical losses. This feature allows more tolerance in manufacturing the connector module and in selecting the materials that are used for the parts. By providing more tolerance with respect to manufacturing and selecting materials for the parts, the overall cost of the connector modules can be kept relatively low in comparison to the cost of the MTP connector module described above with reference to FIGS. 1A-1C. At the same time, the configurations of the connector modules are such that wiggle loss and optical losses due to movements of parts are reduced or eliminated, thereby providing the connector modules with very good performance.

Figure 2:
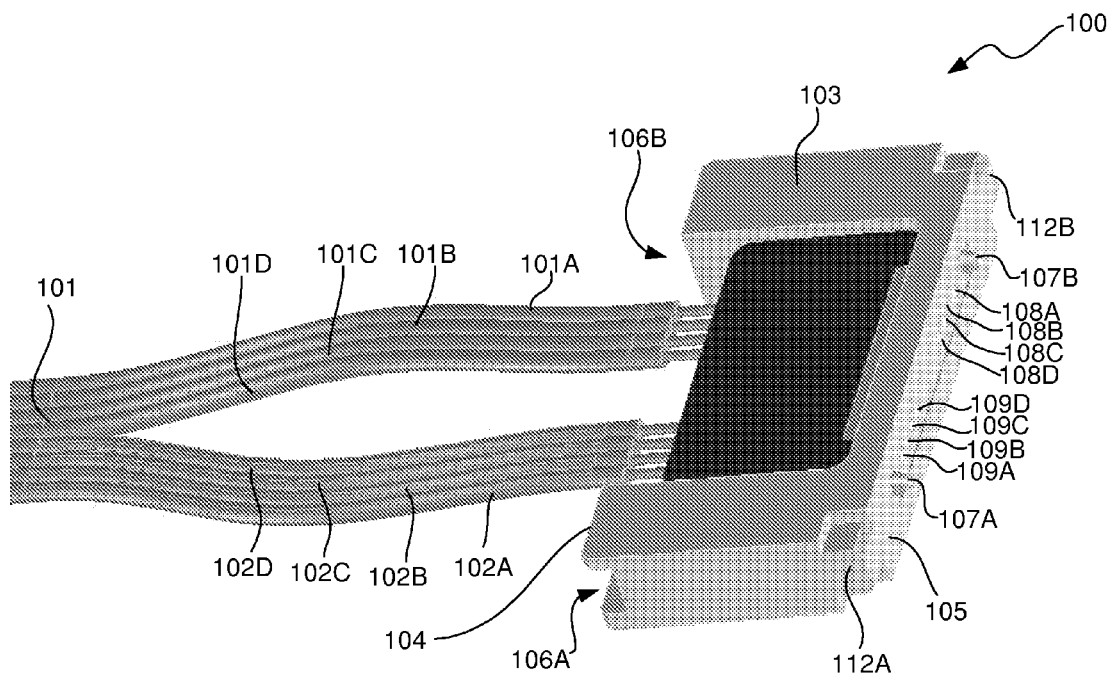
FIG. 2 illustrates a top perspective view of the connector module designed and shaped to connect with the back side of a receptacle of a panel when the connector module is placed in locking engagement with the receptacle.
Figure 3:
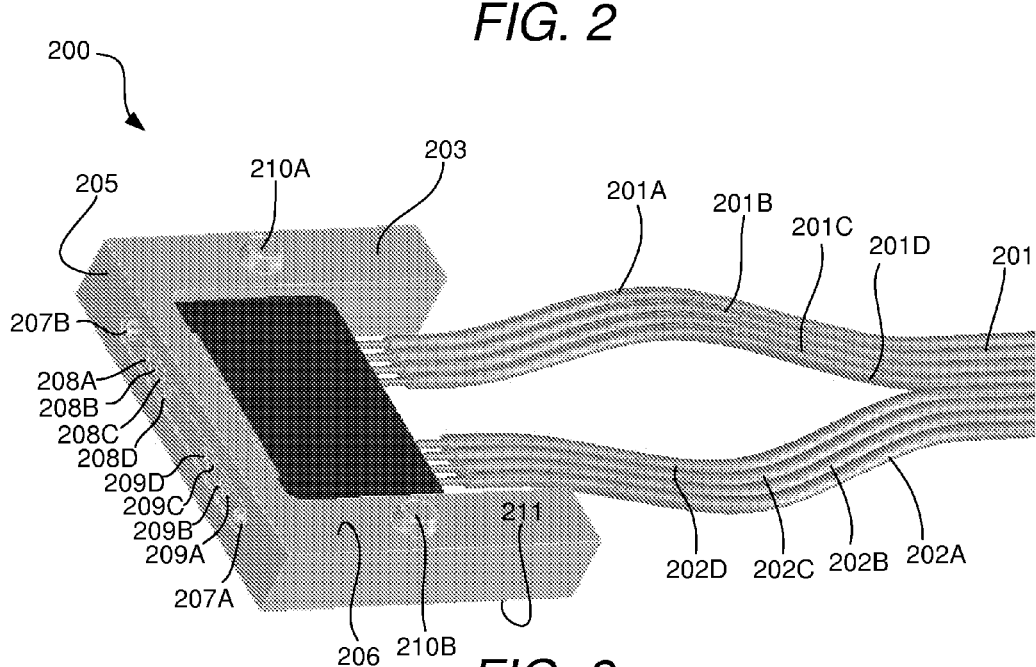
FIG. 3 illustrates a top perspective view of the connector module designed and shaped to connect with the front side of the receptacle when the connector module is placed in locking engagement with the receptacle.
Figure 4A:
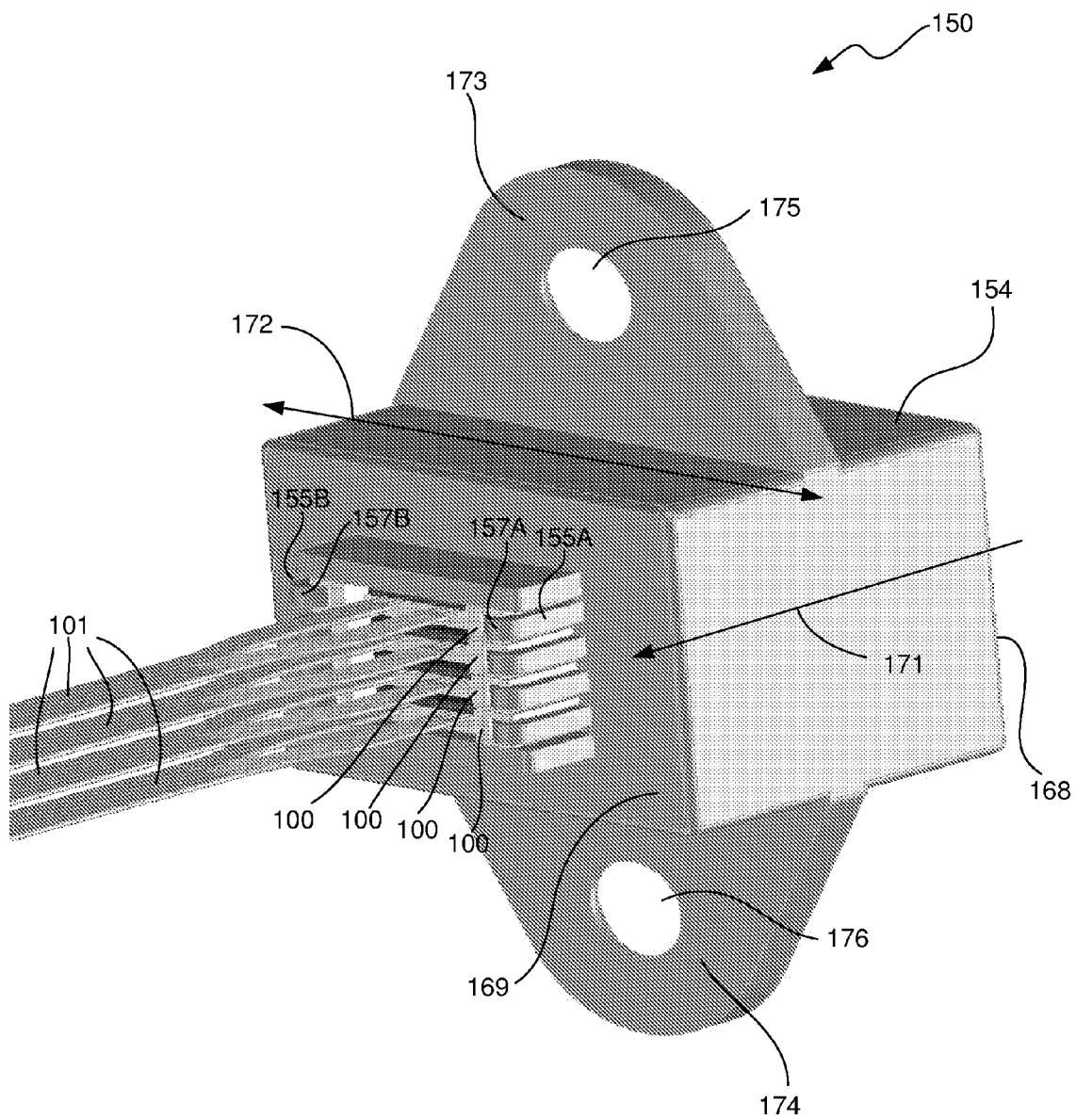
FIGS. 4A and 4B illustrate back side and front side perspective views, respectively, of a receptacle with which the connector modules shown in FIGS. 2 and 3 are designed and shaped to connect in locking engagement.
Figure 4B:
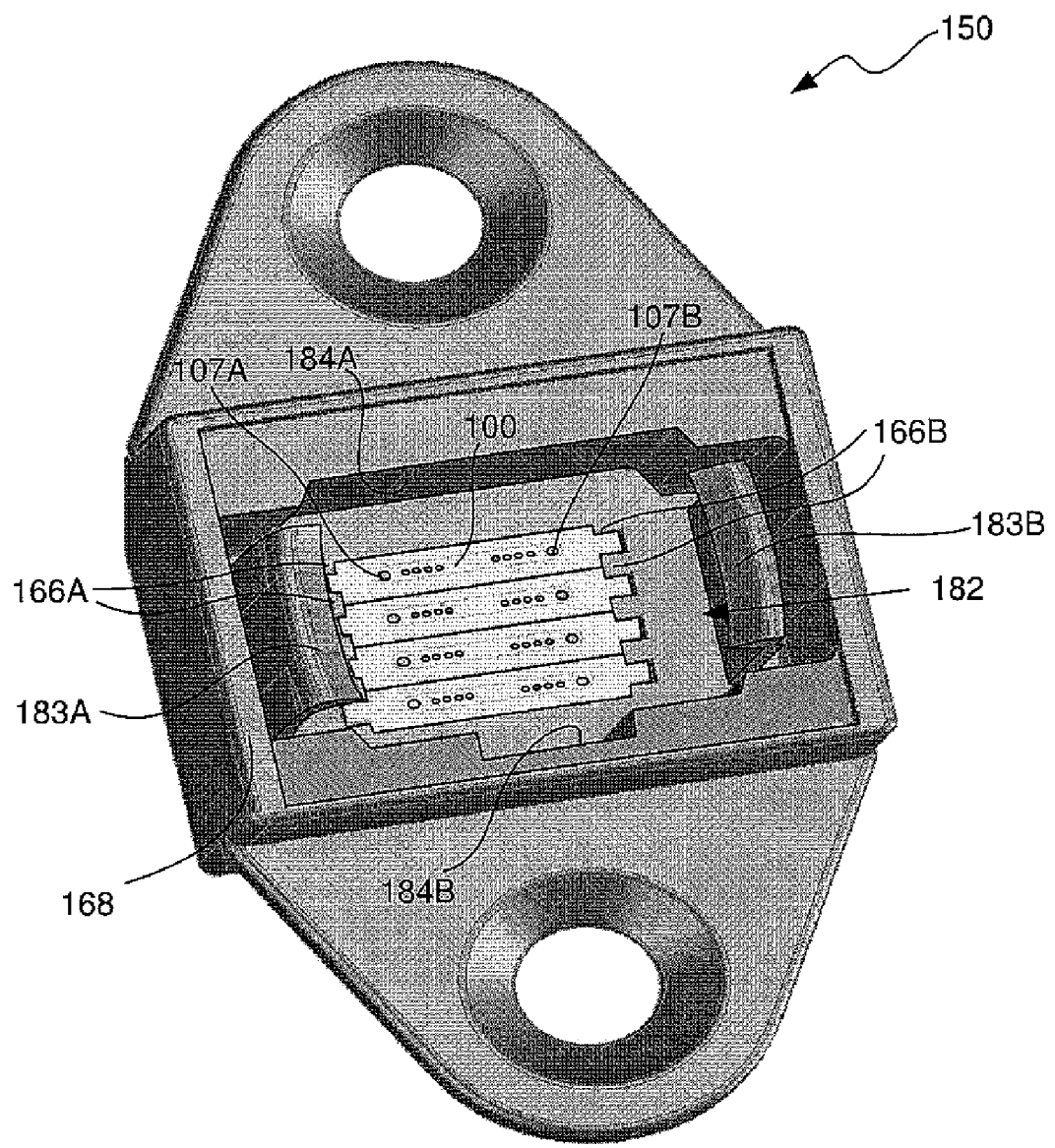

FIG. 2 illustrates a top perspective view of the connector module 100 designed and shaped to connect with the back side of a receptacle (not shown) of a panel when the connector module 100 is placed in locking engagement with the receptacle. FIG. 3 illustrates a top perspective view of the connector module 200 designed and shaped to connect with the front side of the receptacle (not shown) when the connector module 200 is placed in locking engagement with the receptacle. FIGS. 4A and 4B illustrate back side and front side perspective views, respectively, of the receptacle 150 with which the connector modules 100 and 200 are designed and shaped to connect in locking engagement. The receptacle 150 includes tabs 173 and 174 through which connecting devices (e.g., screws) are inserted through holes 175 and 176 to connect the receptacle 150 to a panel (not shown).

The connector module 100 shown in FIG. 2 is a 1-by-8 connector module that holds a row of eight fibers of a fiber ribbon cable 101, four of which are transmit fibers 101A-101D and four of which are receive fibers 102A-102D. The manner in which the cleaved fiber ends (not shown) are held inside of the connector module 100 will be described below with reference to FIGS. 7B and 7C.

The connector module 100 has a module housing 103 that has a back end 104 and a front end 105. The back end 104 has locking mechanisms 106A and 106B that interlock with locking mechanisms 155A and 155B contained on the back side of the receptacle 150 (FIG. 4A). The locking mechanisms 106A and 106B are essentially indentations that are shaped and sized to receive ends of the respective locking mechanisms 155A and 155B. The front end 105 of the connector module 100 has locking mechanisms 112A and 112B that are shaped and sized to mate with respective locking mechanisms 166A and 166B contained in the receptacle (FIG. 4B). All of these locking mechanisms cooperate to provide locking engagement between the connector modules 100 and the back side of the receptacle 150, as shown in FIG. 4A.

The front end 105 of the connector module 100 has two alignment mechanisms 107A and 107B that are generally cone-shaped protrusions that are shaped and sized to mate with generally cone-shaped openings 207A and 207B, respectively formed in the back end 205 of the connector module 200. When the modules 100 and 200 are in locking engagement with the receptacle 150 such that the cone-shaped protrusions 107A and 107B are mated with the cone-shaped openings 207A and 207B, respectively, the connector modules 100 and 200 are in physical and optical alignment with each other.

When the modules 100 and 200 are in locking engagement with each other and the system is operating to transmit and receive optical signals, lenses 108A-108D of the connector module 100 (FIG. 2) receive light output from the ends (not shown) of the fibers 101A-101D, respectively, and focus the light beams onto lenses 208A-208D, respectively, of connector module 200 (FIG. 3). The lenses 208A-208D then focus the light beams onto the ends (not shown) of the fibers 201A-201D, respectively, of a 1-by-8 fiber ribbon cable 201. Lenses 209A-209D of the connector module 200 receive light output from the ends (not shown) of the fibers 202A-202D, respectively, and focus the light beams onto lenses 109A-109D, respectively, of connector module 100. The lenses 109A-109D then focus the light beams onto the ends (not shown) of the fibers 102A-102D, respectively, which then carry the optical signals to the transceiver module (not shown).

The connector module 200 has a module housing 203 on which locking mechanisms 210A and 210B are formed on the top surface 206 of the housing 203. The locking mechanisms 210A and 210B are substantially cylindrical in shape and protrude a small distance upwards in the direction normal to the surface 206. As will be described below with reference to FIGS. 9A and 9B, the module housing 203 has locking mechanisms on the bottom surface of the housing 203 that are complementary to the shapes of the protrusions 210A and 210B and that receive the protrusions 210A and 210B to enable multiple instances of the connector module 200 to be stacked one on top of the other to provide a relatively rigid stack of physically aligned modules 200.

In FIG. 4A, the example of the receptacle 150 shown is configured to receive four of the 1-by-8 connector modules 100 shown in FIG. 2. The locking mechanisms 155A and 155B are essentially arms that attach on proximal ends to the receptacle housing 154 and that have distal ends 157A and 157B that mate with the respective indentations 106A and 106B formed in the housing 103 of the connector module 100. In FIG. 4B, the manner in which the locking mechanisms 166A and 166B formed on the receptacle housing 154 mate with the respective locking mechanisms 112A and 112B formed on the housing 103 of the connector module 100 can be seen. The locking mechanisms 166A and 166B formed on the receptacle housing 154 are essentially rigid upper and lower tabs that extend laterally from the sides of the openings formed in the receptacle 150 for receiving the connector modules 100. The locking mechanisms 112A and 112B of the connector module 100 are essentially side portions of the front end 105 of the connector module 100 that have been molded to form upper and lower cutaway portions that engage the upper and lower tabs that make up the locking mechanisms 166A and 166B of the receptacle 150.

The locking engagement provided by the interlocking of locking mechanisms 106A and 106B of the connector module 100 with the locking mechanisms 155A and 155B of the receptacle 150 limit movement of the connector modules 100 in the direction away from the front side 168 of the receptacle 150 toward the back side 169 of the receptacle 150, as indicated by the arrow 171 in FIG. 4A. This direction will be referred to herein as the front-to-back direction. This locking engagement also prevents movement in the lateral directions indicated by arrow 172 in FIG. 4A, which are transverse to the front-to-back direction. The locking mechanisms 155A and 155B of the receptacle 150 are slightly flexible to allow them to be pulled apart in the lateral directions by an amount sufficient to allow the connector modules 100 to be inserted into the openings formed in the back side of the receptacle 150. After each one of the connector modules 100 has been inserted into the respective opening in the receptacle 150 and the lateral pulling force is removed, the ends 157A and 157B (FIG. 4A) of the respective locking mechanisms 155A and 155B will slide into the indentations 106A and 106B, respectively, formed in the housing 103 of the connector module 100 to lock the connector module 100 to the receptacle 150.

Figure 5:
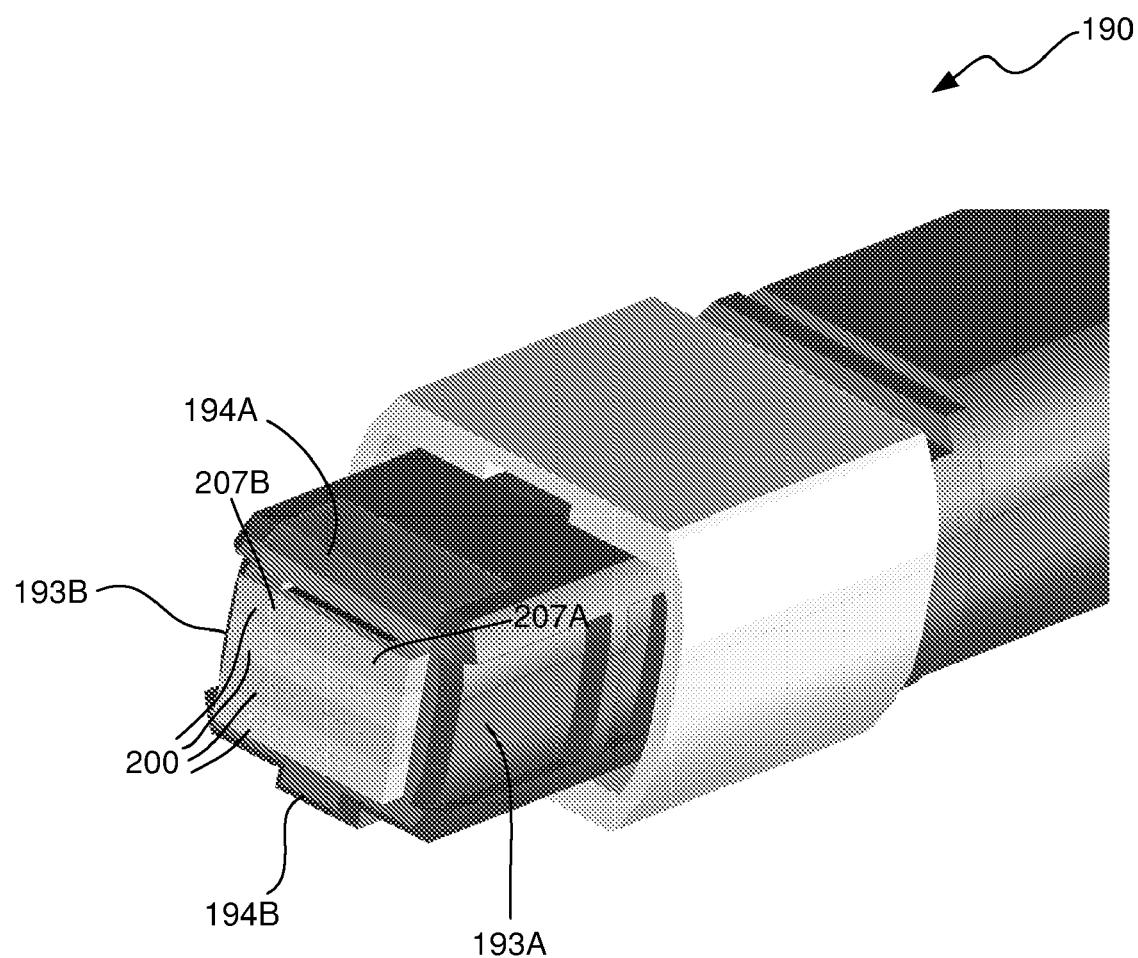
FIG. 5 illustrates a plug having a stack of four of the connector modules shown in FIG. 3 stacked therein, and which is designed and shaped to connect to the front side of the receptacle shown in FIG. 4B.

FIG. 5 illustrates a plug 190 having a stack of four of the connector modules 200 shown in FIG. 3 stacked therein. With reference again to FIG. 4B, the front side 168 of the receptacle 150 is shown with an opening 182 formed therein for receiving the plug 190 shown in FIG. 5. The plug 190 is designed and shaped to be received in the opening 182 formed in the receptacle 150 and to interlock with the receptacle 150. The features 183A, 183B, 184A and 184B that define the opening 182 in the receptacle 150, engage features 193A, 193B, 194A and 194B, respectively, on the exterior of the plug 190 to lock the plug 190 to the receptacle 150. When the plug 190 is connected to the receptacle 150 and is in locking engagement therewith, the protrusions 107A and 107B formed on the housing 103 of the connector module 100 (FIG. 2) are contained within the respective openings 207A and 207B formed in the connector module 200 (FIG. 3), thereby ensuring that the connector modules 100 and 200 are in optical alignment with each other. The tabs that make up the locking mechanisms 166A and 166B of the receptacle 150 and engage the locking mechanisms 112A and 112B of the connector module 100 limit movement in the direction opposite to the front-to-back direction indicated by arrow 171. This direction is referred to herein as the back-to-front direction.

With reference again to FIG. 4A, each of the connector modules 100 is capable of being removed from the receptacle 150 by simply exerting the requisite lateral forces on the ends 157A and 157B of the respective locking mechanisms 155A and 155B to pull the ends 157A and 157B outwards by a sufficient amount to allow the connector module 100 to be removed. This allows re-routing of fibers to be performed easily multiple (e.g., eight) fibers at a time. Of course, the connector module 100 is not limited to accommodating eight fibers, but can be designed to accommodate any number of fibers. However, by configuring the connector modules 100 to accommodate relatively small numbers of fibers, adjustments can easily be made to meet fiber density needs, routing needs or re-routing needs.

Figure 6:
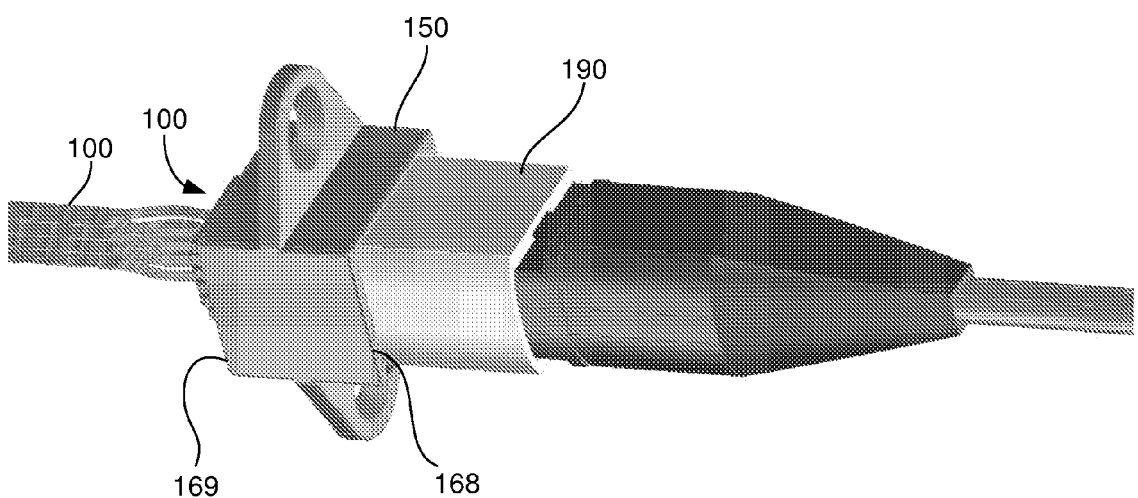
FIG. 6 illustrates a side perspective view of the plug shown in FIG. 5 connected to the front side of the receptacle shown in FIG. 4B and a plurality of the connector modules shown in FIG. 2 connected to the back side of the receptacle.

FIG. 6 illustrates a side perspective view of the plug 190 connected to the front side 168 of the receptacle 150 and the connector modules 100 connected to the back side 169 of the receptacle 150. The connector modules 200 inside of the plug 190 cannot be seen in FIG. 6. Although the receptacle 150 shown in FIGS. 4A and 4B is configured to accommodate four connector modules 100, the receptacle 150 may be designed to accommodate any number of connector modules 100. Likewise, although the plug 190 shown in FIG. 5 is configured to accommodate four connector modules 200, the plug 190 may be designed to accommodate any number of the connector modules 200. Also, the plug 190 is removably connected to the receptacle 150, and may therefore be connected and removed as desired, which also facilitates meeting fiber density and routing/re-routing requirements.

Figure 7A:
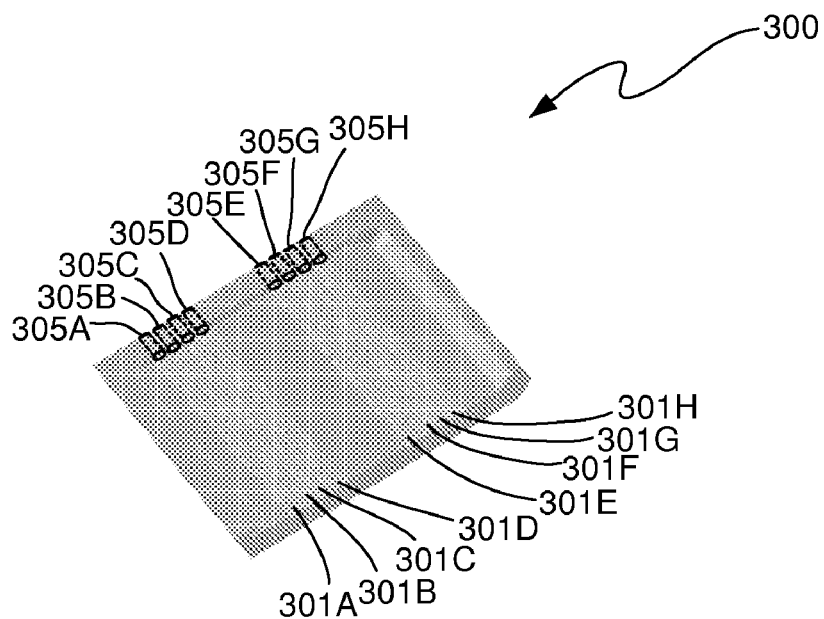
FIGS. 7A-7C show top perspective views of portions of the connector modules shown in FIGS. 2 and 3 that are common to each of the connector modules.
Figure 7B:
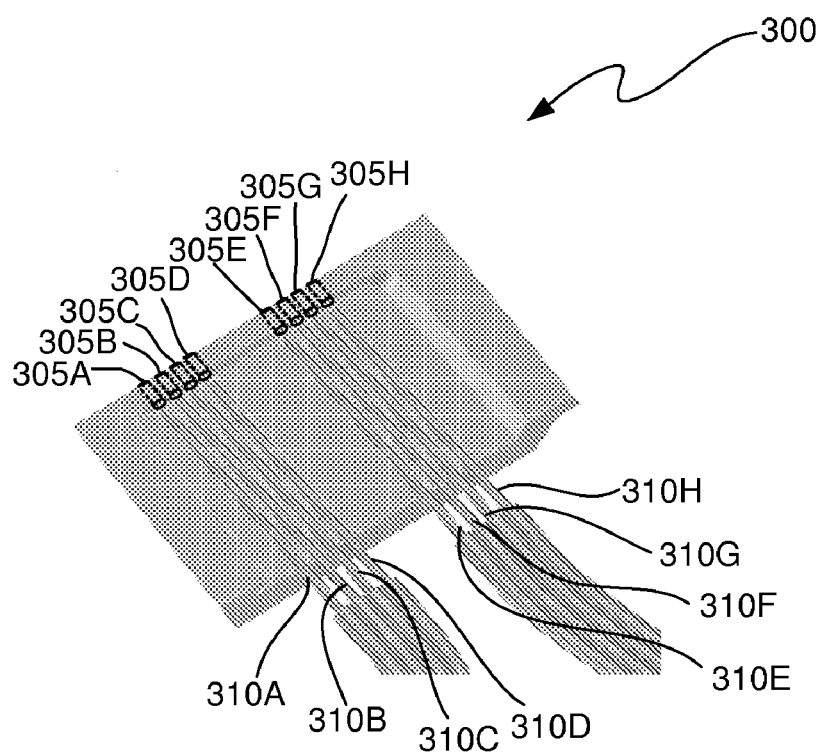
Figure 7C:
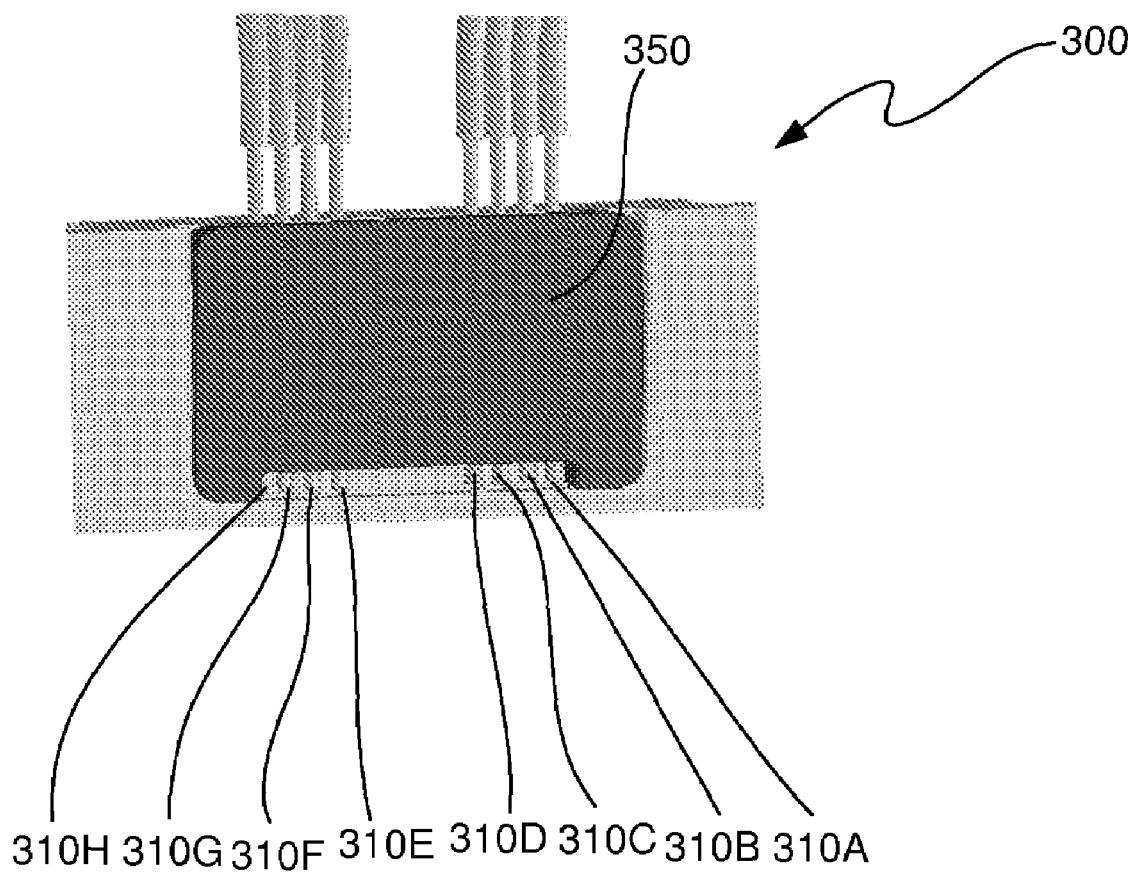

FIGS. 7A-7C show top perspective views of portions 300 of the connector modules 100 and 200 that are common to each of the connector modules 100 and 200. The main differences between the connector modules 100 and 200 are the locking features on the exteriors of the housings that are used to interconnect the modules 100 and 200 to the receptacle 150 and the plug 190, respectively. These locking features are not shown in FIGS. 7A-7C so that the common features of the connector modules 100 and 200 can be described without redundancy.

FIG. 7A illustrates a top perspective view of the portion 300 of the connector module before the ends of the fibers have been secured thereto. The connector modules will typically be made of a molded plastic material. Prior to the ends of the fibers being secured to the connector module, the end portions of the fibers are stripped of the fiber jackets that surround the fiber claddings so that all that remains at the end portions of the fibers are the fiber cores surrounded by their respective claddings. The very ends of the fibers are then cleaved and the cleaved end portions are placed in respective V-grooves 301A-301H formed in the connector module portion 300.

FIG. 7B illustrates a top perspective view of the portion 300 of the connector module after the ends of fibers 310A-310H have been secured within the V-grooves 301A-301H of the connector module portion 300. The lenses 108A-108D, 109A-109D, 208A-208D and 209A-209D shown in FIGS. 2 and 3 formed in the front end 105 of the connector module 100 and in the back end 205 of the connector module 200 are represented in FIGS. 7A and 7B by dashed lines 305A-305H. The lenses 305A-305D either focus light exiting the ends of the fibers 310A-310D onto the respective lenses of the opposing connector module, or receive light from lenses of the opposing connector module and focus the light into the ends of the fibers 310A-310D, depending on whether the portion 300 is part of the connector module 100 or part of the connector module 200. Likewise, the lenses 305E-305H either focus light exiting the ends of the fibers 310E-310H onto the respective lenses of the opposing connector module, or receive light from lenses of the opposing connector module and focus the light into the ends of the fibers 310E-310H, depending on whether the portion 300 is part of the connector module 100 or part of the connector module 200.

FIG. 7C illustrates a front perspective view of the portion 300 of the connector module having the ends of the fibers 310A-310H secured therein by a cover 350. The cover 350 has crushing features (not shown) that are partially crushed (i.e., deformed) as they are pressed against the end portions of the fibers 310A-310H when the cover 350 is snapped onto the body of the connector module. These crushing features ensure that the end portions of the fibers are tightly located against the V-grooves 301A-301H and do not move after the cover 350 has been installed.

Prior to installing the cover 350, the fiber end portions are covered with a refractive index matching epoxy (not shown). The index-matching epoxy bonds the end portions of the fibers 310A-310H to the cover 350 and provides optical coupling between the ends of the fibers 310A-310H and the respective lenses 305A-305H for coupling light from the lenses and the ends of the fibers. By cleaving the ends of the fibers and using the index-matching epoxy to provide optical coupling, the potential for misalignment to occur as a result of temperature changes is eliminated, or at least greatly reduced, due to the fact that the portion of the connector module that holds the fibers is made of the same material as the portion of the connector module in which the lenses are held. Because these portions are made of the same material (e.g., plastic), they have the same coefficients of thermal expansion (CTE). Consequently, a change in temperature that results in movement of one portion will result in movement of the other portion by the same amount and direction.

Figure 8:
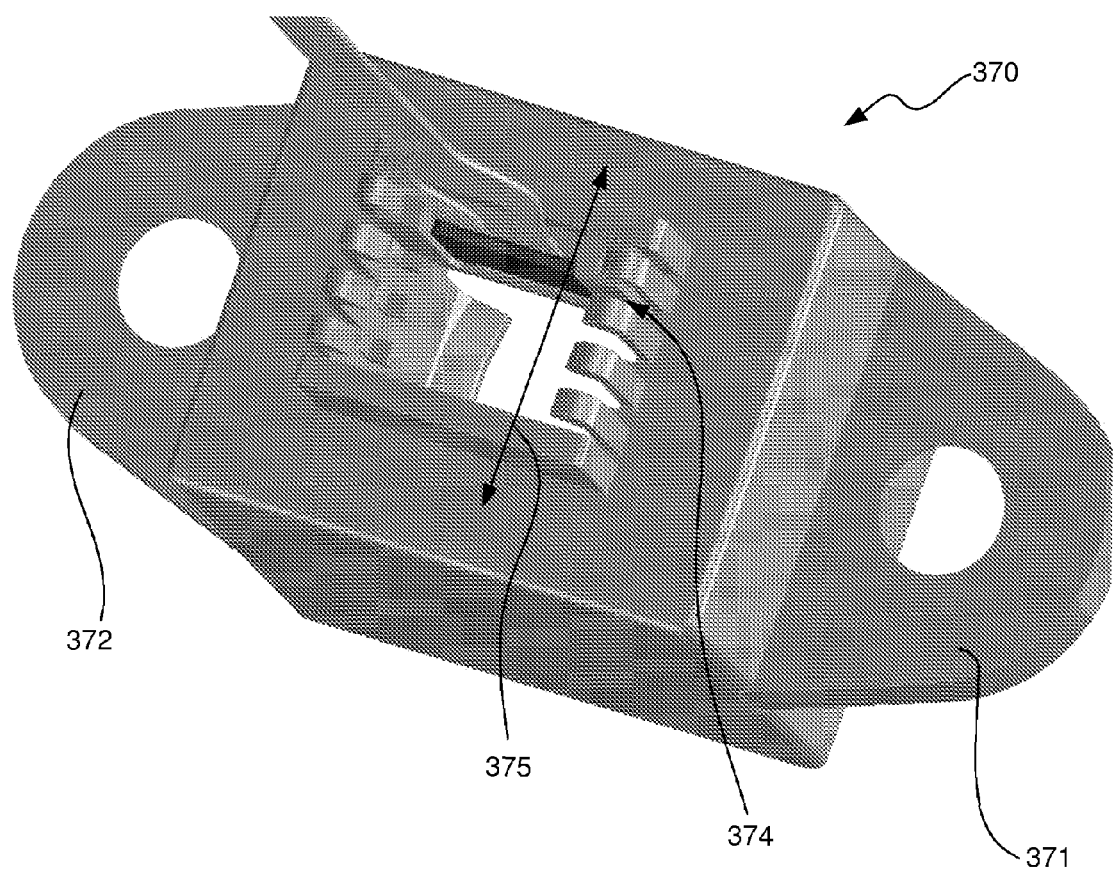
FIG. 8 illustrates a back side perspective view of the receptacle in accordance with another illustrative embodiment in which the tabs for connecting the receptacle to a panel are on the sides of the receptacle rather than on the top and bottom of the receptacle.

FIG. 8 illustrates a back side perspective view of the receptacle 370 in accordance with another illustrative embodiment having the tabs 371 and 372 for connecting the receptacle 370 to a panel on the sides of the receptacle 370 rather than on the top and bottom of the receptacle 370. Otherwise, the receptacle 370 is identical to the receptacle 150 shown in FIGS. 4A and 4B. As stated above, small air gaps 374 exist between the connector modules 100 after the connector modules 100 have been inserted into the receptacle 370. These air gaps 374 allow the connector modules 100 to "float", i.e., to move slightly up and down in the directions indicated by arrow 375. As stated above, this float allows each of the connector modules 100 to be precisely coupled with a respective opposing connector module 200 of the relatively rigid stack held in the plug to effect physical and optical alignment between the respective connector modules 100 and 200. This, in turn, allows very high fiber density requirements to be met by simply stacking as many one line (e.g., 1-by-8, 1-by-12, 1-by-16, etc.) connector modules 100 and 200 as are needed to meet the fiber density. This flexibility in meeting density requirements is achieved without sacrificing optical alignment precision, and thus without resulting in optical losses and degradation in signal integrity. In fact, optical alignment precision on the order of a micrometer is achievable. In addition, the connector modules and receptacles are fabricated using a diamond-turnable process, which ensures extremely high alignment precision.

Figure 9A:
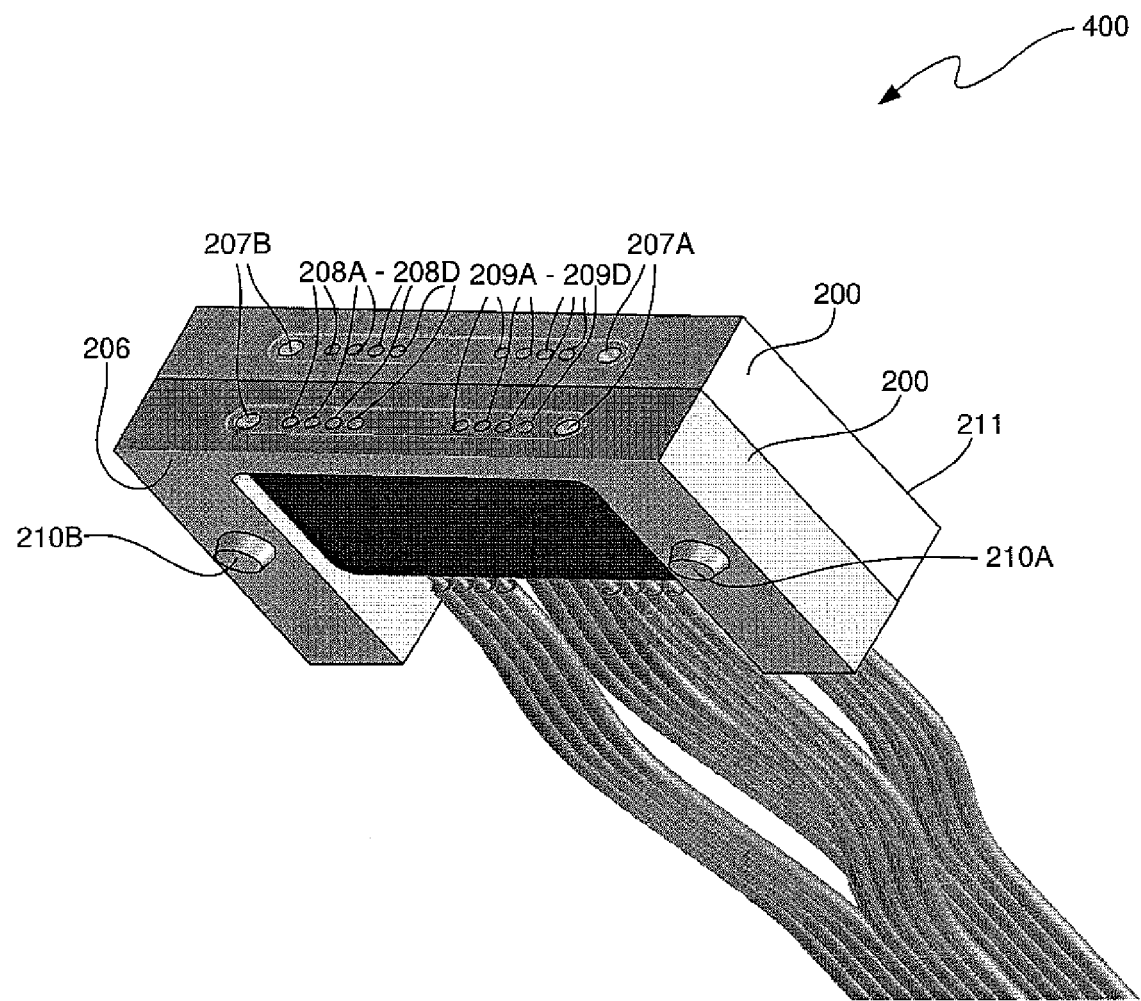
FIGS. 9A and 9B illustrate, respectively, top and bottom perspective views of a stack of two of the connector modules shown in FIG. 3.
Figure 9B:
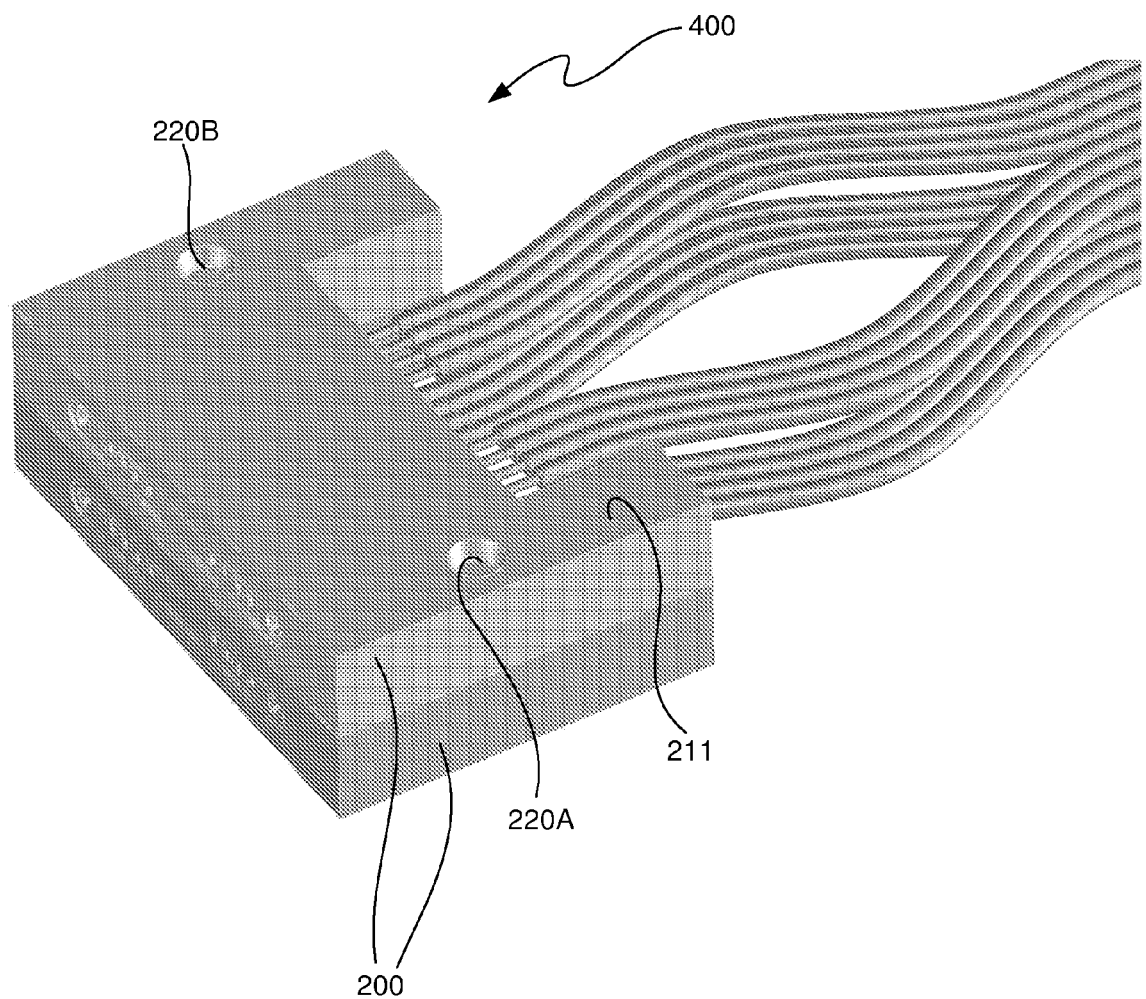

FIGS. 9A and 9B illustrate, respectively, top and bottom perspective views of a stack 400 of two of the connector modules 200 shown in FIG. 3. The generally cylindrically-shaped protrusions 210A and 210B formed on the top surface 206 of the connector module 200 shown in FIG. 9A mate with generally cylindrically-shaped openings 220A and 220B, respectively, formed in the bottom surface 211 of the connector module 200 shown in FIG. 9B. When the stack 400 is installed in the plug 190 (FIG. 5) and the plug 190 is connected to the front side of the receptacle 150 (FIG. 4B), the generally cone-shaped protrusions 107A and 107B on the connector modules 100 (FIG. 2) mate with the generally cone-shaped openings 207A and 207B formed in the connector modules 200 (FIG. 3), thereby aligning the lenses 108A-109D of the connector modules 100 (FIG. 2) with the respective lenses 208A-209D (FIGS. 3 and 9A) of the connector modules 200 to provide the necessary optical alignment.

As described above, when the plug 190 is inserted into the receptacle and mated therewith, the connector modules 100 of the floating stack will move to the extent necessary to ensure that protrusions 107A and 107B precisely mate with the openings 207A and 207B such that no physical misalignment is possible. This ensures that optical alignment is precise and that no mechanical moments result from the coupling that might damage the parts.

It should be noted that the invention has been described with respect to illustrative embodiments for the purpose of describing the principles and concepts of the invention. The invention is not limited to these embodiments. For example, while the invention has been described with reference to using particular alignment and locking mechanisms, the invention is not limited to these components or to the overall configurations of the connector modules, receptacles and plugs. As will be understood by those skilled in the art in view of the description being provided herein, modifications may be made to the embodiments described to provide a system that achieves the goals of the invention, and all such modifications are within the scope of the invention.

What is claimed is:

1. A multi-fiber connector module comprising:
   a connector module housing having a connector module locking mechanism to enable the connector module housing to be interlocked with a receptacle locking mechanism of a panel receptacle in a floating configuration that allows the connector module housing to move slightly within the panel receptacle, the connector module locking mechanism including at least a air of connector module locking features that are configured to interlock with a respective pair of receptacle locking features of the receptacle locking mechanism and wherein the floating configuration is due at least in part to an air gap that exists above the connector module housing and an air gap that exists below the connector module housing when the pair of connector module locking features is interlocked with the respective pair of receptacle locking features, the air gaps allowing the connector module housing to move slightly into the air gaps when corresponding forces are applied to the connector module housing in directions that are generally toward the air gaps; and a cover secured to the connector module housing, the cover holding ends of respective optical fibers in optical alignment with respective lenses, the ends of the optical fibers being cloven and left in as-cloven conditions such that respective end faces of the respective ends have a roughness and angle that result when the respective fibers are cloven, and wherein the cloven ends of the fibers are covered with a refractive index-matching material.

2. The multi-fiber connector module of claim 1, further comprising:
one or more connector module locking mechanisms for enabling the connector module to interlock with connector module locking mechanisms of another multi-fiber connector module such that the interlocked multi-fiber connector modules are held in optical alignment with each other to enable optical signals to be communicated between the connector modules.

3. The multi-fiber connector module of claim 1, wherein the connector module locking mechanisms and the receptacle locking mechanisms are configured such that they may be unlocked to enable the connector module housing to be disengaged from the panel receptacle.

4. A receptacle for interfacing a plurality of floating multi-fiber connector modules with a plurality of stacked multi-fiber connector modules, the receptacle comprising:
a first receptacle side having multiple receptacle locking mechanisms configured to interlock with multiple respective connector module locking mechanisms disposed on multiple respective connector module housings the connector module housings are inserted into the first receptacle side, each receptacle locking mechanism including a pair of receptacle locking features that interlock with a respective pair of connector module locking features of a respective connector module locking mechanism of a respective one of the connector module housings when the respective one of the connector module housings is inserted into the first receptacle side, and wherein an air gap exists above and below each respective connector module housing when the respective connector module housing is engaged with the first receptacle side, the air gaps allowing each connector module housing to move slightly into the air gaps above and below the connector module housing when a force is applied to the connector module housing in a direction that is generally toward the air gap above or below the connector module housing, and wherein the allowed movement of the connector module housings into the air gaps provides a floating configuration for the connector module housings within the receptacle;
a second receptacle side having at least one plug locking mechanisms configured to interlock with a plug having multiple connector module housings stacked therein in a substantially rigid configuration in which the connector module housings stacked in the plug are restrained from movement within the plug; and
wherein if the plug having multiple connector module housings stacked therein is interlocked with the second receptacle side and at least one connector module housing is interlocked with the looking mechanisms of the first receptacle side, at least one of the stacked connector modules in the plug will be interconnected with and optically aligned with at least one of the floating connector modules in the first receptacle side.

5. The receptacle of claim 4, wherein the receptacle is configured to be connected to a panel, and wherein the first receptacle side corresponds to a back side of the panel and the second receptacle side corresponds to a front side of the panel.

6. The receptacle of claim 4, wherein the receptacle is configured to be connected to a panel, and wherein the first receptacle side corresponds to a front side of the panel and the second receptacle side corresponds to a back side of the panel.

7. A method for optically coupling together multi-fiber connector modules comprising:
providing a panel having a receptacle attached thereto, the receptacle having a first receptacle side and a second receptacle side, the first receptacle side having multiple receptacle locking mechanisms configured to interlock with multiple respective connector module locking mechanisms of multiple respective multi-fiber connector module housings when the connector module housings are inserted into the first receptacle side each receptacle locking mechanism including a pair of receptacle locking features that interlock with a respective pair of connector module locking features of a respective connector module locking mechanism of a respective one of the connector module housings when the respective one of the connector module housings is inserted into the first receptacle side, and wherein an air gap exists above and below each respective connector module housing when the respective connector module housing is engaged with the first receptacle side, the air gaps allowing each connector module housing to move slightly into the air gaps above and below the connector module housing when a force is applied to the connector module housing in a direction that is generally toward the air gap above or below the connector module housing, and wherein the allowed movement of the connector module housings into the air gaps provides a floating configuration for the connector module housings within the receptacle and wherein the second receptacle side has at least one plug locking mechanisms configured to interlock with a plug;
inserting at least one of the multi-fiber connector modules into the first receptacle side to interlock the respective receptacle locking mechanism of the first side of the receptacle with the respective connector module locking mechanism of the inserted connector module;
inserting at least one multi-fiber connector module into a plug, the plug having a plug housing being configured to have multiple connector module housings stacked therein in a substantially rigid configuration in which the connector module housings stacked in the plug are restrained from substantially any movement within the plug housing after one or more locking mechanisms on the stack have been interlocked with one or more locking mechanisms on the plug housing; and
inserting the plug into the second receptacle side, wherein when the plug is inserted into the second receptacle side, one or more locking mechanisms of said at least one multi-fiber connector module inserted in the plug are interconnected with one or more locking mechanisms of said multi-fiber connector module inserted in the first receptacle side and the interconnected multi-fiber connector modules are optically aligned with each other to allow optical signals to be coupled between the interconnected connector modules.

8. The method of claim 7, wherein each of the multi-fiber connector modules inserted into the first receptacle side and the plug comprises:
multiple lenses secured with the connector module housing; and a cover secured to the connector module housing, the cover pressing the ends of respective optical fibers against the connector module housing and holding each fiber end in optical alignment with a respective one of the lenses, the ends of the optical fibers being cloven and left in as-cloven conditions such that respective end faces of the respective ends of the cloven fibers have a roughness and angle that result when the respective fibers are cloven, and wherein the cloven ends of the fibers are covered with a refractive index-matching material.

9. The method of claim 8, wherein when the plug is inserted into the second receptacle side and interlocked therewith, respective lenses of said at least one multi-fiber connector module inserted into the first receptacle side are adjacent and optically aligned with respective lenses of said at least one multi-fiber connector module.

10. The method of claim 7, wherein the first receptacle side corresponds to a front side of the panel and wherein the second receptacle side corresponds to a back side of the panel.

11. The method of claim 7, wherein the first receptacle side corresponds to a back side of the panel and wherein the second receptacle side corresponds to a front side of the panel.

12. The method of claim 7, wherein said at least one multi-fiber connector module inserted in the first receptacle side is removable from the first receptacle side by unlocking the receptacle and connector module locking mechanisms that interlock the first receptacle side with said at least one multi-fiber connector module inserted in the first receptacle side and removing said at least one multi-fiber connector module from the first receptacle side.

* * * * *

UNITED STATES PATENT AND TRADEMARK OFFICE
CERTIFICATE OF CORRECTION

PATENT NO. : 7,553,091 B2
APPLICATION NO. : 11/751101
DATED : June 30, 2009
INVENTOR(S) : Larry McColloch It is certified that error appears in the above-identified patent and that said Letters Patent is hereby corrected as shown below:

Cover page, Column 1, under "Related U.S. Application Data",
 insert --U.S. Nonprovisional application No. 11/669,247 filed on Jan 31, 2007
       U.S. Nonprovisional application No. 11/683,118 filed on Mar 7, 2007--.

Column 10, Line 54, Claim 1, delete "air" and insert --pair--.

Column 10, line 57, Claim 1, after "mechanism" insert --,--.

Column 11, Line 20, Claim 3, delete "mechanisms" and insert --mechanism--.

Column 11, Line 21, Claim 3, delete "mechanisms" and insert --mechanism--.

Column 11, Line 31 (Approx.), Claim 4, after "housings" insert --when--.

Column 11, Line 52 (Approx.), Claim 4, delete "mechanisms" and insert --mechanism--.

Column 11, Line 61, Claim 4, delete "looking" and insert --locking--.

Column 12, Line 17, Claim 7, after "side" insert --,--.

Column 12, Line 36, Claim 7, after "receptacle" insert --,--.

Column 12, Line 37, Claim 7, delete "mechanisms" and insert --mechanism--.

Signed and Sealed this
Twelfth Day of March, 2013

Teresa Stanek Rea
*Acting Director of the United States Patent and Trademark Office*